United States Patent Office 3,605,830
Patented Sept. 20, 1971

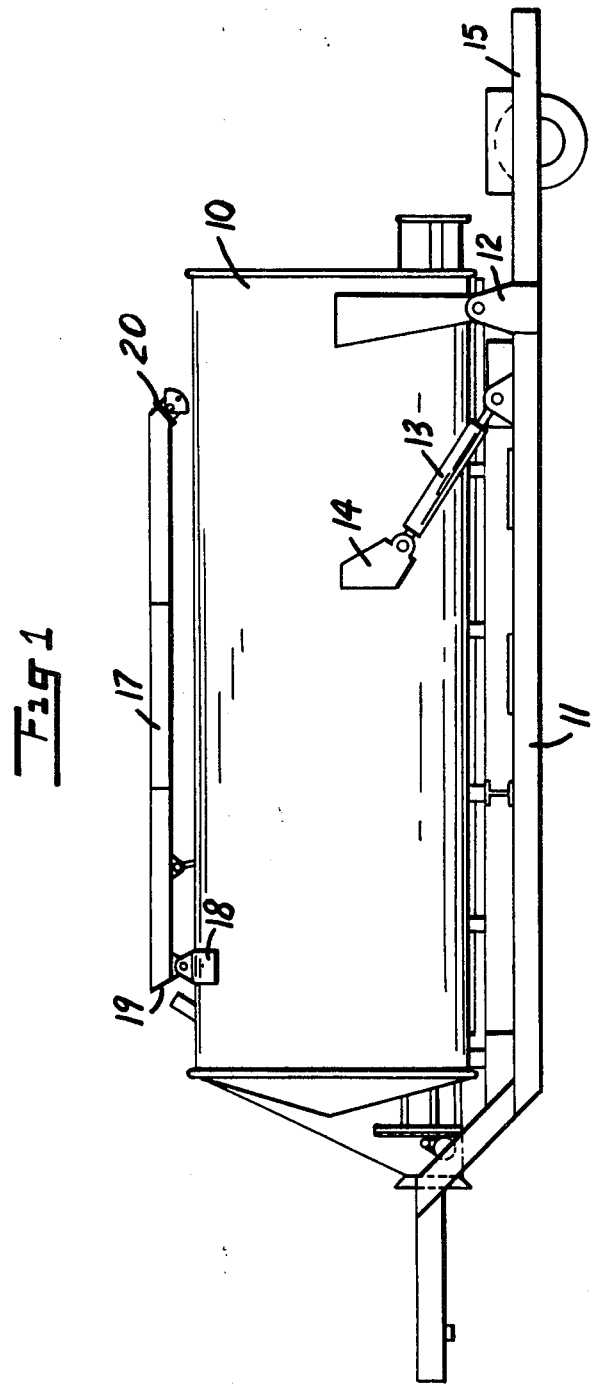

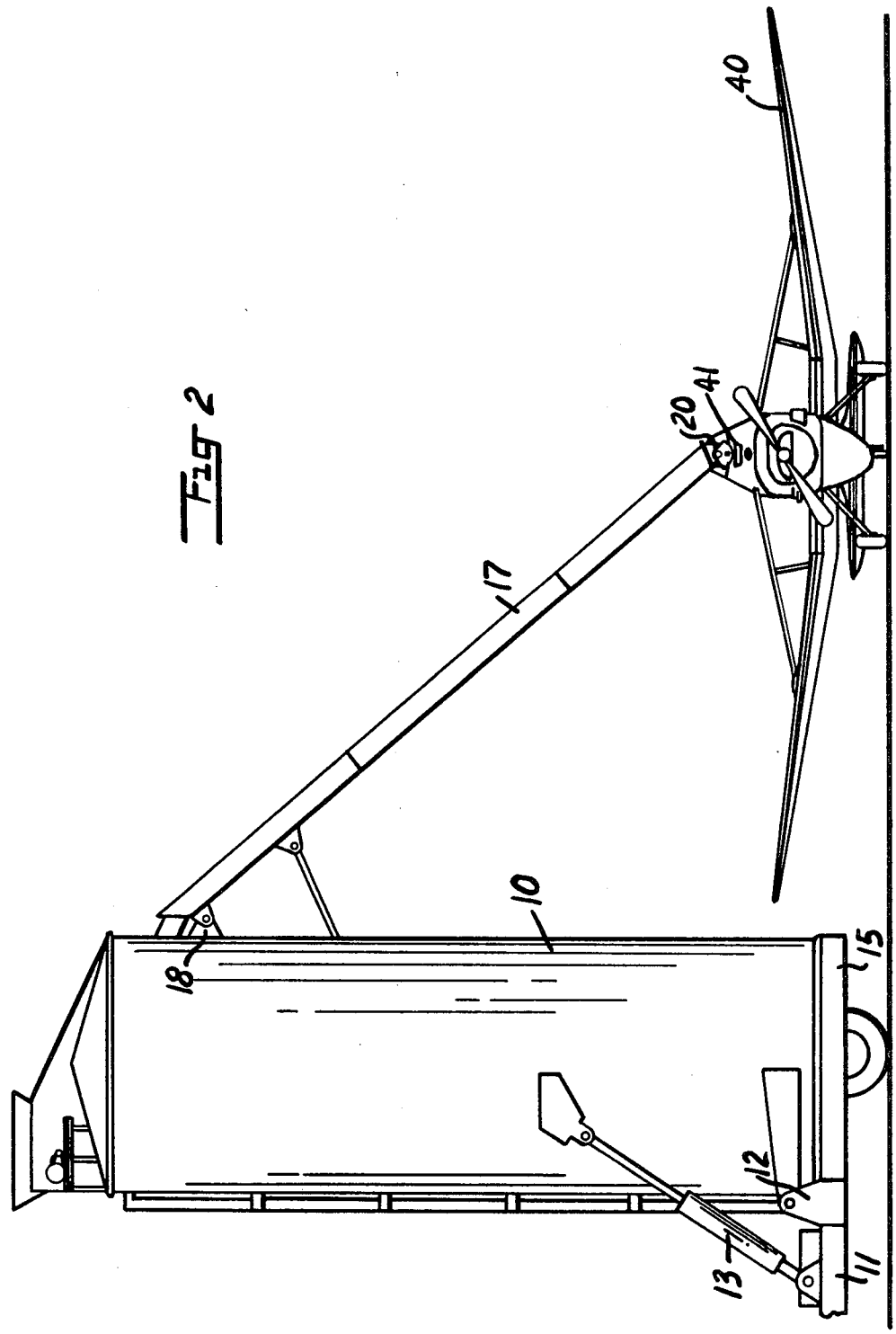

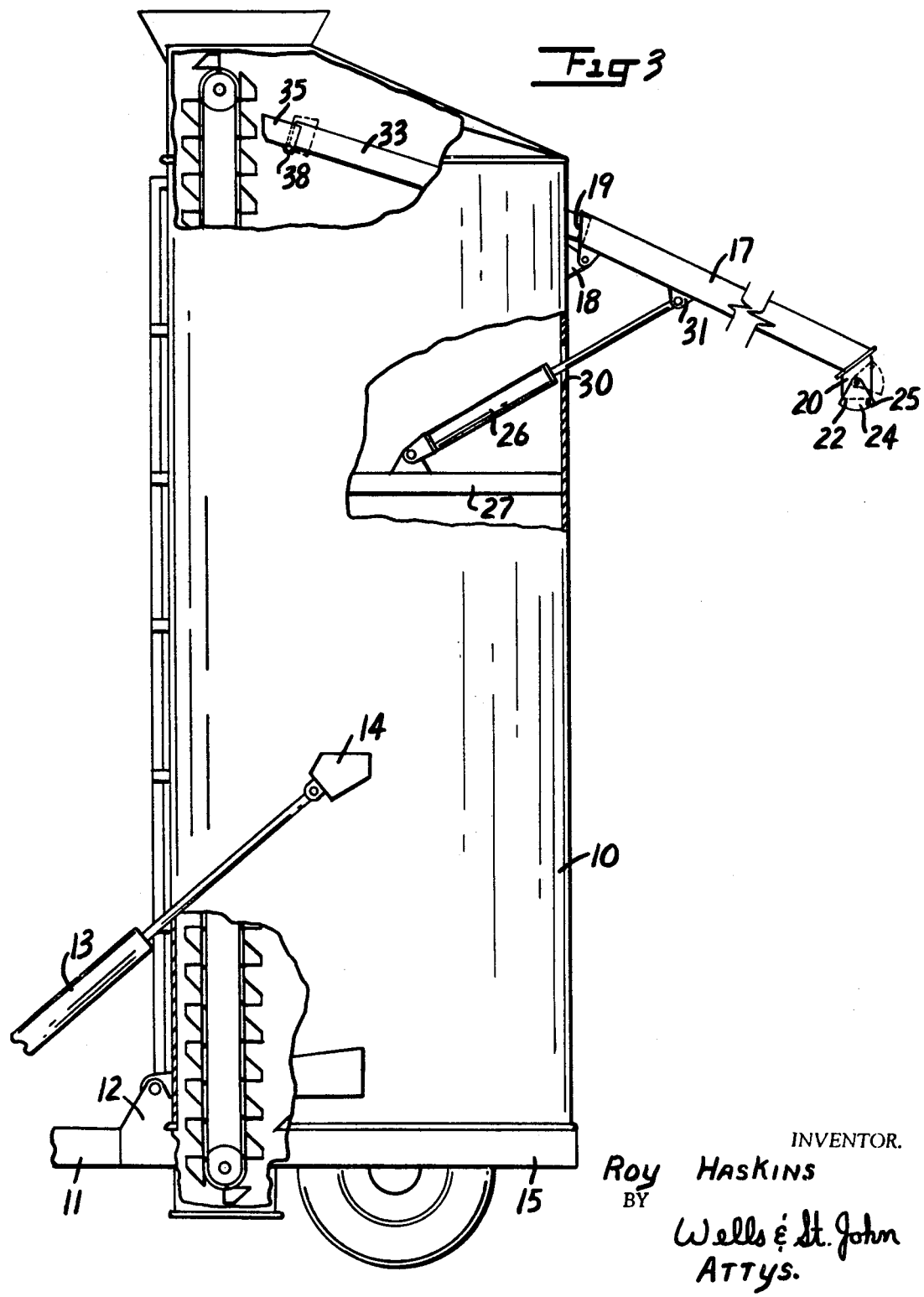

3,605,830
DISPENSING DEVICE FOR STORAGE BIN
Roy Haskins, % The Haskins Co., Inc., P.O. Box 4215,
Station B, Spokane, Wash. 99202
Filed Oct. 21, 1968, Ser. No. 769,030
Int. Cl. B67c 3/26; B65b 1/04; B60p 1/04
U.S. Cl. 141—284                                    5 Claims

ABSTRACT OF THE DISCLOSURE

A dispensing device is described for a portable cylindrical storage bin to discharge a full load of agricultural chemicals into an airplane. The dispensing device includes a vertical conveyor, a chute and elongated spout pivotally mounted to the exterior of the bin. The spout is pivoted by a hydraulic cylinder to position a discharge opening over the body of the airplane.

BACKGROUND OF THE INVENTION

This invention relates to dispensing devices for storage bins and more particularly to dispensing devices for portable storage bins to load granular agricultural chemicals into applicators such as crop dusting airplanes.

A portable storage bin of the general type referred to is described in U.S. Pat. No. 3,208,616. Such a storage bin is tiltable from a horizontal transporting position to an upright storage poistion at the storage site. Frequently such a storage bin is ideal for storing granular agricultural chemicals that are to be used in crop dusting.

One of the principal objects of this invention is to provide a dispensing device for such a storage bin to efficiently load the granular agricultural chemical into an applicator such as a crop dusting airplane.

An additional object of this invention is to provide a versatile dispensing device that is economical to manufacture and simple to construct operate and maintain.

A further object of this invention is to provide a versatile dispensing device for a storage bin that does not interfere with the transporting of the storage bin when it is in a horizontal transporting position.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a side elevational view of a storage bin with a dispensing device embodying the principal features of this invention; the storage bin is shown in a horizontal transporting position on a trailer;

FIG. 2 is a side elevational view of the storage bin and the accompanying dispensing device showing the storage bin in the erected upright position with the dispensing device extended to load granular agricultural chemicals into a crop dusting airplane; and FIG. 3 is a fragmentary side elevational view showing the principal elements of the dispensing device.

DETAILED DESCRIPTION OF A PREFERRED EMBODIMENT

Referring to FIG. 1 there is illustrated a cylindrical storage bin or facility 10 that is pivotally mounted on a trailer 11 for rendering the storage bin portable. The storage bin is pivotally mounted on the trailer through pivot blocks 12 to provide a pivot axis to the side of the storage bin. Hydraulic cylinders 13 extend between the trailer and the storage bin spaced from the pivot axis to pivot the storage bin from the horizontal transporting position shown in FIG. 1 to the upright erected storage position illustrated in FIG. 2. The hydraulic cylinders 13 are connected to the side of the cylindrical storage bin through brackets 14. When the storage bin is pivoted to the upright position, support is provided by the rear frame 15 of the trailer. Different types of support frames may be provided. Frequently a detachable frame is desirable to be able to disconnect the trailer after the storage bin is erected.

A dispensing device is provided on the storage bin to discharge granular agricultural chemicals from the storage facility to a vehicle such as a crop dusting plane 40 shown in FIG. 2. The dispensing device includes an elongated spout 17 that is pivotally mounted to the side of the storage bin 10. The upper end of the elongated spout is pivotally mounted to a bracket 18 to enable the lower end of the elongated spout to be pivoted outwardly and upwardly from the side of the storage bin. The elongated spout 17 has a predetermined length and cross section for containing a prescribed volume of granular agricultural chemicals. The length of the spout is substantially greater than half the span of the wings of the crop dusting planes to facilitate the loading of the chemicals into the body of the plane.

The elongated spout 17 has an upper opening 19 that is beveled at an acute angle to the longitudinal axis of the spout. The spout 17 has a bottom section 20 that extends at a slight angle to the longitudinal axis of the spout to deflect the agricultural chemical in a substantially downward vertical direction when the spout is pivoted outwardly at an acute angle to the side of the storage bin. The elongated spout has a discharge opening 22 to permit the agricultural chemical contained within the elongated spout to flow from the spout when a clam shell valve 24 is opened. The clam shell valve 24 as shown in FIGS. 2 and 3 is mounted on the bottom section 20 and a handle 25 is affixed thereto for enabling the operator to manually open and close the clam shell valve 24.

As shown in FIG. 3 a hydraulic cylinder 26 is mounted on a brace 27 within the storage bin and extends outwardly connecting with the spout 17 spaced from the pivot bracket 18. The piston rod of the cylinder 26 extends through an opening 30 in the side of the storage bin to connect with the bracket 31 on the exterior of the spout 17.

The dispensing device further includes a bucket conveyor 32 that is mounted within the storage bin and extends vertically when the storage bin is in the upright position for conveying agricultural chemicals to the upper position of the storage bin.

A chute 33 is mounted within the storage bin, at an inclined angle, with the upper end elevated to a position adjacent the upper portion of the bucket conveyors 32 for receiving the agricultural chemicals from the conveyor. The lower end of the chute 33 extends through the side of the storage bin in communication with the beveled opening 19 of the spout.

A feed valve means is mounted on the upper end of the chute 33 for controlling the flow of agricultural chemicals into the chute 33 and the spout 17. The valve means includes a cup-shaped enclosure 35 that is pivotally mounted to the side of the upper end at 38 for pivoting from the open position upwardly over the upper end of the chute 33 to prevent the flow of agricultural chemicals into the chute and to permit the agricultural chemicals to descend and accumulate below the chute.

As shown in FIG. 2 the hydraulic cylinder 26 is extendable to move the spout outwardly to direct the discharge opening 22 immediately above the hopper 41 in the airplane 40. The spout has a predetermined volume capacity which is equivalent to the capacity of the airplane hopper 41. Thus the airplane may be parked to the side of the storage bin and then the hydraulic cylinder actuated to pivot the spout outwardly to immediately discharge a full load of agricultural chemicals into the hopper. This provides for a very easy, convenient and effective method of loading the agricultural chemical in the airplane hopper. It has been found that by using this equipment the airplane may be loaded within a very few minutes with a full load of agricultural chemicals. The turn-around time between loads has been substantially reduced.

It should be understood that the above described embodiment is simply illustrative of the principles of this invention and numerous other modifications may be made without deviating from the scope of this invention. Therefore, only the following claims are intended to define this invention.

What is claimed is:

1. A dispensing device for a storage bin that contains granular agricultural chemical in which the dispensing device dispenses a load of a predetermined amount of the granular agricultural chemical having a prescribed volume from the storage bin into a hopper of a vehicle parked adjacent to the bin, said dispensing device comprising:

(a) an elongated spout having an upper end pivotally mounted to the side of the storage bin and having a lower end with a discharge opening; said spout having an interior volume equal to the prescribed volume of said predetermined amount of agricultural chemical;

(b) feed means for feeding the agricultural chemical into the spout through the upper end to fill the interior volume of the spout with the predetermined amount to form the load;

(c) a selectively operated discharge valve means at the discharge opening for normally enclosing the discharge opening to enable the spout to be filled and for opening the discharge openings when the discharge valve means is selectively operated to dispense the load of agricultural chemical through the discharge opening;

(d) drive means operatively connected to the spout for pivoting the spout to swing the lower end outwardly from the storage bin to position the discharge opening directly over the vehicle hopper to direct the dispensed load into the vehicle hopper.

2. The dispensing device as defined in claim 1 wherein the vehicle is a crop dusting airplane having a predetermined wing span and wherein the spout has a length greater than half of the span of the airplane wings.

3. The dispensing device as defined in claim 1 wherein the feed means includes an upright conveyor mounted within the storage bin for conveying the agricultural chemical to an upper portion of the storage bin and into a downwardly extending chute that communicates with the spout.

4. The dispensing device as defined in claim 3 wherein the feed means further includes a feed valve means for controlling the flow of agricultural chemical from the upright conveyor to the chute.

5. The dispensing device as defined in claim 1 wherein the storage bin is portable and tiltable from a horizontal transport position to an upright storage position and wherein the spout is pivotable from a position alongside the storage bin to an extended position to direct the discharge opening to the vehicle hopper.

References Cited
UNITED STATES PATENTS

| | | | |
|---|---|---|---|
| 2,744,670 | 5/1952 | Bendot | 141—284 |
| 3,265,232 | 8/1966 | Lythgoe | 214—508 |

FOREIGN PATENTS

| | | | |
|---|---|---|---|
| 55,640 | 7/1943 | Netherlands | 141—387 |
| 659,699 | 11/1961 | Italy | 214—508 |

WILLIAM F. O'DEA, Primary Examiner

W. S. RATLIFF, JR., Assistant Examiner

U.S. Cl. X.R.

141—387; 214—508